US012646254B2

(12) United States Patent (10) Patent No.: US 12,646,254 B2
Ge et al. (45) Date of Patent: Jun. 2, 2026

(54) METHOD AND DEVICE FOR QUICKLY MEASURING ROCK JOINT BASED ON HUGE POINT CLOUD DATA

(71) Applicant: CHINA UNIVERSITY OF GEOSCIENCES (WUHAN), Wuhan (CN)

(72) Inventors: Yunfeng Ge, Wuhan (CN); Zihao Li, Wuhan (CN); Zhongxu Wen, Wuhan (CN); Zilong Zhang, Wuhan (CN); Changyang Liu, Wuhan (CN); Bin Hu, Wuhan (CN); Haitao Wu, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 187 days.

(21) Appl. No.: 18/772,003

(22) Filed: Jul. 12, 2024

(65) Prior Publication Data

US 2025/0322598 A1    Oct. 16, 2025

(30) Foreign Application Priority Data

Apr. 16, 2024    (CN) .......................... 202410451352.2

(51) Int. Cl.
*G06T 17/00* (2006.01)
*G06T 5/70* (2024.01)
*G06T 7/64* (2017.01)

(52) U.S. Cl.
CPC ............... *G06T 17/00* (2013.01); *G06T 5/70* (2024.01); *G06T 7/64* (2017.01); *G06T 2207/20044* (2013.01)

(58) Field of Classification Search
None
See application file for complete search history.

(56) References Cited

U.S. PATENT DOCUMENTS

| | | | |
|---|---|---|---|
| 10,352,693 B2 | 7/2019 | Abovitz et al. | |
| 10,789,527 B1 * | 9/2020 | Raichelgauz ......... | G06F 18/254 |
| 10,866,093 B2 | 12/2020 | Abovitz et al. | |
| 10,936,908 B1 * | 3/2021 | Ho .......................... | G06V 10/26 |
| 11,288,412 B2 | 3/2022 | Golparvar-Fard et al. | |
| 2024/0296536 A1 * | 9/2024 | Wang ........................ | F42D 3/04 |

* cited by examiner

*Primary Examiner* — Talha M Nawaz

(57) ABSTRACT

A method for quickly measuring a rock joint of a rock mass based on huge point cloud data includes performing computation by introducing parallel computing to obtain a point curvature matrix and a point normal vector matrix corresponding to a vectorized point cloud coordinate data matrix; sequentially performing global parameter vectorization, normalization, and data screening on the vectorized point cloud coordinate data matrix, the point curvature matrix and the point normal vector matrix to obtain a training point cloud dataset; training an intelligent rock joint identification model through the training point cloud dataset to obtain a well-trained intelligent rock joint identification model; performing rock joint identification on a to-be-measured point cloud dataset through the well-trained intelligent rock joint identification model to obtain a plurality of rock joint sets; and computing an occurrence of each single rock joint in each of the rock joint sets.

8 Claims, 8 Drawing Sheets

S1— Acquire an initial point cloud dataset for the rock joint, perform preprocessing and node vectorization on the initial point cloud dataset to obtain a vectorized point cloud coordinate data matrix, and perform computation by introducing parallel computing to obtain a point curvature matrix and a point normal vector matrix corresponding to the vectorized point cloud coordinate data matrix S2— Sequentially perform global parameter vectorization, normalization and data screening on the vectorized point cloud coordinate data matrix, the point curvature matrix and the point normal vector matrix to obtain a training point cloud dataset S3— Construct an intelligent rock joint identification model through a shallow neural network, and train the intelligent rock joint identification model through the training point cloud dataset to obtain a well-trained intelligent rock joint identification model S4— Acquire a to-be-measured point cloud dataset, and perform rock joint identification on the to-be-measured point cloud dataset through the well-trained intelligent rock joint identification model to obtain a plurality of rock joint sets S5— Perform data segmentation on a rock joint set with a number of single rock joints greater than a preset value, other than remaining rock joint sets a rock joint set with a number of single rock joints less than the preset value, extract the single rock joints from the rock joint set through the parallel computing, and compute to obtain an occurrence of each of the single rock joints in the rock joint set

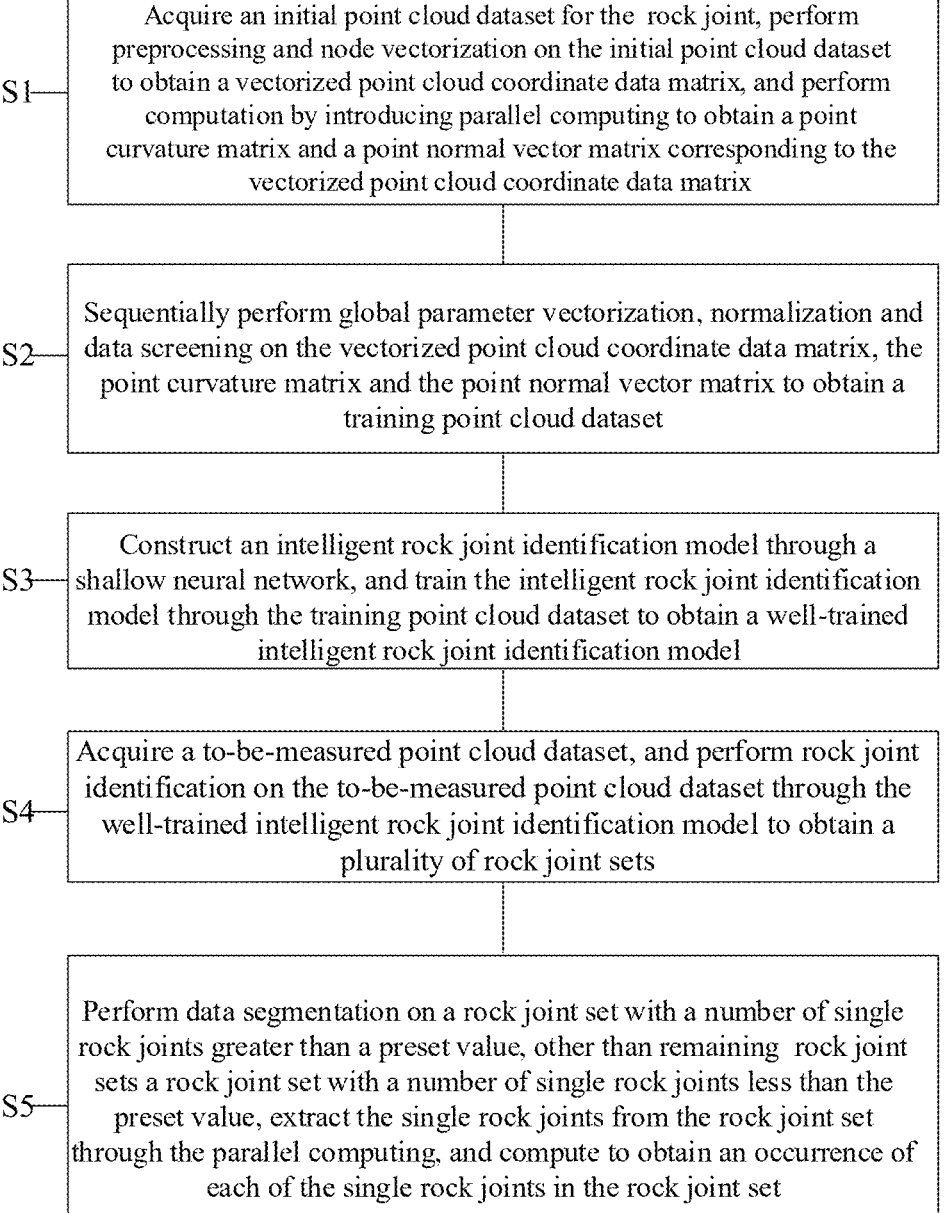

S1 — Acquire an initial point cloud dataset for the rock joint, perform preprocessing and node vectorization on the initial point cloud dataset to obtain a vectorized point cloud coordinate data matrix, and perform computation by introducing parallel computing to obtain a point curvature matrix and a point normal vector matrix corresponding to the vectorized point cloud coordinate data matrix S2 — Sequentially perform global parameter vectorization, normalization and data screening on the vectorized point cloud coordinate data matrix, the point curvature matrix and the point normal vector matrix to obtain a training point cloud dataset S3 — Construct an intelligent rock joint identification model through a shallow neural network, and train the intelligent rock joint identification model through the training point cloud dataset to obtain a well-trained intelligent rock joint identification model S4 — Acquire a to-be-measured point cloud dataset, and perform rock joint identification on the to-be-measured point cloud dataset through the well-trained intelligent rock joint identification model to obtain a plurality of rock joint sets S5 — Perform data segmentation on a rock joint set with a number of single rock joints greater than a preset value, other than remaining rock joint sets a rock joint set with a number of single rock joints less than the preset value, extract the single rock joints from the rock joint set through the parallel computing, and compute to obtain an occurrence of each of the single rock joints in the rock joint set

FIG. 1

| Color | Density Concentrations | | |
|---|---|---|---|
| | 0.00 | - | 1.40 |
| | 1.40 | - | 2.80 |
| | 2.80 | - | 4.20 |
| | 4.20 | - | 5.60 |
| | 5.60 | - | 7.00 |
| | 7.00 | - | 8.40 |
| | 8.40 | - | 9.80 |
| | 9.80 | - | 11.20 |
| | 11.20 | - | 12.60 |
| | 12.60 | - | 14.00 |

| Contour Data | Pole Vectors |
|---|---|
| Maximum Density | 13.68% |
| Contour Distribution | Fisher |
| Counting Circle Size | 1.0% |

| Plot Mode | Pole Vectors |
|---|---|
| Vector Count | 1289 (1289 Entries) |
| Hemisphere | Lower |
| Projection | Equal Angle |

| Color | Density Concentrations | | |
|---|---|---|---|
| | 0.00 | - | 1.40 |
| | 1.40 | - | 2.80 |
| | 2.80 | - | 4.20 |
| | 4.20 | - | 5.60 |
| | 5.60 | - | 7.00 |
| | 7.00 | - | 8.40 |
| | 8.40 | - | 9.80 |
| | 9.80 | - | 11.20 |
| | 11.20 | - | 12.60 |
| | 12.60 | - | 14.00 |

| Contour Data | Pole Vectors |
|---|---|
| Maximum Density | 13.78% |
| Contour Distribution | Fisher |
| Counting Circle Size | 1.0% |

| Plot Mode | Pole Vectors |
|---|---|
| Vector Count | 1290 (1290 Entries) |
| Hemisphere | Lower |
| Projection | Equal Angle |

| Color | Density Concentrations | |
|---|---|---|
| | 0.00 | - | 1.50 |
| | 1.50 | - | 3.00 |
| | 3.00 | - | 4.50 |
| | 4.50 | - | 6.00 |
| | 6.00 | - | 7.50 |
| | 7.50 | - | 9.00 |
| | 9.00 | - | 10.50 |
| | 10.50 | - | 12.00 |
| | 12.00 | - | 13.50 |
| | 13.50 | - | 15.00 |

| Contour Data | Pole Vectors |
|---|---|
| Maximum Density | 14.07% |
| Contour Distribution | Fisher |
| Counting Circle Size | 1.0% |

| Plot Mode | Pole Vectors |
|---|---|
| Vector Count | 1297 (1297 Entries) |
| Hemisphere | Lower |
| Projection | Equal Angle |

1

METHOD AND DEVICE FOR QUICKLY MEASURING ROCK JOINT BASED ON HUGE POINT CLOUD DATA

CROSS-REFERENCE TO RELATED APPLICATIONS

This application claims priority to Chinese Patent Application No. 202410451352.2 with a filing date of Apr. 16, 2024. The content of the aforementioned application, including any intervening amendments thereto, is incorporated herein by reference.

TECHNICAL FIELD

The present disclosure relates to the technical field of rock joint measurement and, in particular, to a method and device for quickly measuring a rock joint based on huge point cloud data.

BACKGROUND

Rock mass refers to field rock consisting of many discontinuous rock joints containing fractures, joints, beddings, faults, and the like in certain geological conditions. It is a complex geological body. Rock mass discontinuities not only play a critical role in rock structures but also control the mechanical and hydraulic properties of the rock mass. Hence, accurate identification of the rock joints and computation of their occurrences are of great significance in rock engineering.

Many devices, such as a compass, a clinometer, and a scanline, are used to measure rock joints using conventional methods. The methods for measuring orientations of discontinuity of the rock by means of direct contact are mastered and operated easily, with controllable accuracy. However, they also have many defects. For example, when the compass or the measuring line is used to measure the occurrences of the rock joints, the accuracy will be deviated. It is risky to acquire data in dangerous or unsafe regions and also time-consuming and labor-consuming to acquire large-scale data. Compared with conventional contact measurement, remote sensing, and non-contact measurement solve the above problems well. Particularly, laser scanning has been widely applied to geological disaster monitoring and geographic space analysis for its high accuracy, high efficiency, and other advantages. At present, there emerge endless methods for measuring the rock joints based on three-dimensional (3D) laser scanning. Nevertheless, these methods all have one problem in common. That is, the rock joints cannot be identified quickly and efficiently, and associated information cannot be extracted. Particularly for a huge dataset, the computational efficiency is low, and the algorithm running time is long. In response to huge data, the existing methods are far from satisfactory for intelligent and efficient identification of the rock joints and thus cannot be widely applied.

SUMMARY OF PRESENT INVENTION

In view of this, an objective of the present disclosure is to provide a method and device for quickly measuring a rock joint of a rock mass based on huge point cloud data to solve the technical problem that a rock joint cannot be identified quickly and efficiently and associated information cannot be extracted in the prior art.

The present disclosure provides a method for quickly measuring a rock joint of a rock mass based on huge point cloud data, including:

S1, acquiring an initial point cloud dataset for the rock joint of the rock mass, performing preprocessing and node vectorization on the initial point cloud dataset to obtain a vectorized point cloud coordinate data matrix, and performing computation by introducing parallel computing to obtain a point curvature matrix and a point normal vector matrix corresponding to the vectorized point cloud coordinate data matrix;

S2, sequentially performing global parameter vectorization, normalization, and data screening on the vectorized point cloud coordinate data matrix, the point curvature matrix, and the point normal vector matrix to obtain a training point cloud dataset;

S3, constructing an intelligent rock joint identification model through a shallow neural network, and training the intelligent rock joint identification model through the training point cloud dataset to obtain a well-trained intelligent rock joint identification model;

S4, acquiring a to-be-measured point cloud dataset, and performing rock joint identification on the to-be-measured point cloud dataset through the well-trained intelligent rock joint identification model to obtain a plurality of rock joint sets; and S5, performing data segmentation on a rock joint set with a number of single rock joints greater than a preset value, other than a rock joint set with a number of single rock joints less than the preset value, extracting the single rock joints from the rock joint set through the parallel computing, and computing to obtain an occurrence of each of the single rock joints in the rock joint set.

Preferably, the step S1 specifically includes:

S11, acquiring the initial point cloud dataset for the rock joint of the rock mass and performing filtration and denoising on the initial point cloud dataset to obtain a preprocessed point cloud dataset;

S12, merging an x-axis coordinate set, a y-axis coordinate set and a z-axis coordinate set of each node in the preprocessed point cloud dataset into the vectorized point cloud coordinate data matrix M, the M being expressed as:

$$M = (x \quad y \quad z) = \begin{pmatrix} x_1 & y_1 & z_1 \\ x_2 & y_2 & z_2 \\ \vdots & \vdots & \vdots \\ x_{i-1} & y_{i-1} & z_{i-1} \\ x_i & y_i & z_i \end{pmatrix}_{i \times 3}$$

$$x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}$$

where, i is the total number of nodes, $x_i$ is an x-axis coordinate of an ith node, $y_i$ is a y-axis coordinate of the ith node, and $z_i$ is a z-axis coordinate of the ith node;

S13, taking, for a node $(x_u, y_u, z_u)$, four neighboring nodes, and the node as a point matrix, where the node has a weight of 2, and the four neighboring nodes have a weight of 1; and performing fitting on the point matrix through a least square method to obtain a plane $p_u$ of the node $(x_u, y_u, z_u)$, and taking a normal vector of the plane $p_u$ as a point normal vector of the node $(x_u, y_u, z_u)$, where u is a serial number of the node, and the u has a maximum of i;

S14, computing an eigenvalue and an eigenvector for a covariance matrix of the node $(x_u, y_u, z_u)$, and computing a point curvature of the node $(x_u, y_u, z_u)$ through the eigenvalue and the eigenvector; and S15, the computation is performed by parallel computing to obtain point curvatures and point normal vectors of all of the nodes, thereby obtaining the point curvature matrix and the point normal vector matrix.

Preferably, the step S2 specifically includes:

S21, merging the vectorized point cloud coordinate data matrix, the point curvature matrix, and the point normal vector matrix into a variable matrix A;

S22, performing normalization on the variable matrix A, and mapping a numerical value to [0,1] to obtain a normalized data matrix P'; and S23, screening a node with an eigenvalue greater than a preset value from the normalized data matrix P', and taking the screened node as the training point cloud dataset.

Preferably, the variable matrix A is expressed as:

$$A = (x \quad y \quad z \quad X \quad Y \quad Z \quad k) = \begin{pmatrix} x_1 & y_1 & z_1 & X_1 & Y_1 & Z_1 & k_1 \\ x_2 & x_2 & x_2 & x_2 & x_2 & x_2 & x_2 \\ \vdots & \vdots & \vdots & \vdots & \vdots & \vdots & \vdots \\ x_{i-1} & x_{i-1} & x_{i-1} & x_{i-1} & x_{i-1} & x_{i-1} & x_{i-1} \\ x_i & x_i & x_i & x_i & x_i & x_i & x_i \end{pmatrix}_{i \times 7}$$

$$x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}$$

$$X = \begin{pmatrix} X_1 \\ X_2 \\ \vdots \\ X_{i-1} \\ X_i \end{pmatrix}_{i \times 1} \quad Y = \begin{pmatrix} Y_1 \\ Y_2 \\ \vdots \\ Y_{i-1} \\ Y_i \end{pmatrix}_{i \times 1} \quad Z = \begin{pmatrix} Z_1 \\ Z_2 \\ \vdots \\ Z_{i-1} \\ Z_i \end{pmatrix}_{i \times 1} \quad k = \begin{pmatrix} k_1 \\ k_2 \\ \vdots \\ k_{i-1} \\ k_i \end{pmatrix}_{i \times 1}$$

where, i is a total number of nodes, $x_i$ is an x-axis coordinate of an ith node, $y_i$ is a y-axis coordinate of the ith node, $z_i$ is a z-axis coordinate of the ith node, $X_i$ is a component of a point normal vector of the ith node in an x-axis direction, $Y_i$ is a component of the point normal vector of the ith node in a y-axis direction, $Z_i$ is a component of the point normal vector of the ith node in a z-axis direction, and $k_i$ is a point curvature of the ith node.

Preferably, the normalized data matrix P' is expressed as:

$$P' = \frac{A - B}{C - B}$$

$$B = \begin{pmatrix} \min(x) & \min(y) & \min(z) & \min(X) & \min(Y) & \min(Z) & \min(k) \\ \min(x) & \min(y) & \min(z) & \min(X) & \min(Y) & \min(Z) & \min(k) \\ \vdots & \vdots & \vdots & \vdots & \vdots & \vdots & \vdots \\ \min(x) & \min(y) & \min(z) & \min(X) & \min(Y) & \min(Z) & \min(k) \\ \vdots & \vdots & \vdots & \vdots & \vdots & \vdots & \vdots \end{pmatrix}_{i \times 7}$$

$$C = \begin{pmatrix} \max(x) & \max(y) & \max(z) & \max(X) & \max(Y) & \max(Z) & \max(k) \\ \max(x) & \max(y) & \max(z) & \max(X) & \max(Y) & \max(Z) & \max(k) \\ \vdots & \vdots & \vdots & \vdots & \vdots & \vdots & \vdots \\ \max(x) & \max(y) & \max(z) & \max(X) & \max(Y) & \max(Z) & \max(k) \\ \vdots & \vdots & \vdots & \vdots & \vdots & \vdots & \vdots \end{pmatrix}_{i \times 7}$$

where, min( ) is to take a minimum element in the matrix, and max( ) is to take a maximum element in the matrix.

Preferably, the step S5 specifically includes:

S51, setting a coordinate range of a segmented block, and performing, through the coordinate range, the data segmentation on the rock joint set with the number of single rock joints being greater than the preset value;

S52, selecting a data point in any rock joint set and setting a radius range with the data point as a center, where if a number of data points in the radius range is greater than a threshold, the data point is deemed as a core point; and if a data point in a radius range of the core point is also a core point, the two core points are classified into a same cluster;

S53, sequentially traversing all data points in the rock joint set through the parallel computing to obtain a plurality of clusters, extracting the single rock joints through the clusters; and S54, computing the occurrence of the single rock joint through principal component analysis (PCA).

Preferably, the coordinate range of the segmented block is expressed as:

$$X \min_{n \times m} = \min(x)$$

$$X \max_{n \times m} = \max(x)$$

$$Y \min_{n \times m} = \min(y) + (n - 1)[\max(y) - \min(y)] \div H$$

$$Y \max_{n \times m} = \min(y) + (n)[\max(y) - \min(y)] \div H$$

$$Z \min_{n \times m} = \min(z) + (m - 1)[\max(z) - \min(z)] \div J$$

$$Z \max_{n \times m} = \min(z) + (m)[\max(z) - \min(z)] \div J$$

$$x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}$$

$$X = \begin{pmatrix} X_1 \\ X_2 \\ \vdots \\ X_{i-1} \\ X_i \end{pmatrix}_{i \times 1} \quad Y = \begin{pmatrix} Y_1 \\ Y_2 \\ \vdots \\ Y_{i-1} \\ Y_i \end{pmatrix}_{i \times 1} \quad Z = \begin{pmatrix} Z_1 \\ Z_2 \\ \vdots \\ Z_{i-1} \\ Z_i \end{pmatrix}_{i \times 1}$$

where, i is a total number of nodes, $x_i$ is an x-axis coordinate of an ith node, $y_i$ is a y-axis coordinate of the ith node, $z_i$ is a z-axis coordinate of the ith node, $X_i$ is a component of a point normal vector of the ith node in an x-axis direction, $Y_i$ is a component of the point normal vector of the ith node in a y-axis direction, and $Z_i$ is a component of the point normal vector of the ith node in a z-axis direction; H represents a number of segmented blocks of the rock joint set in the y-axis direction, and J represents a number of segmented blocks of the rock joint set in the z-axis direction;

X $\min_{n \times m}$ and X $\max_{n \times m}$ respectively represent a minimum x-axis coordinate and a maximum x-axis coordinate on an nth column and an mth row after the rock joint set is segmented into H×J blocks;

Y $\min_{n \times m}$ and Y $\max_{n \times m}$ respectively represent a minimum y-axis coordinate and a maximum y-axis coordinate on the nth column and the mth row after the rock joint set is segmented into the H×J blocks; and Z $\min_{n \times m}$ and Z $\max_{n \times m}$ respectively represent a minimum z-axis coordinate and a maximum z-axis coordinate on the nth column and the mth row after the rock joint set is segmented into the H×J blocks.

The present disclosure provides a storage medium, which stores instructions and data to realize the method for quickly measuring a rock joint of a rock mass based on huge point cloud data.

The present disclosure provides a device for quickly measuring a rock joint of a rock mass based on huge point cloud data, including a processor and a storage medium, the processor loads and executes an instruction and data in a storage medium to realize the method for quickly measuring a rock joint of a rock mass based on huge point cloud data.

The present disclosure has the following beneficial effects:

The present disclosure computes the point curvature matrix and the point normal vector matrix for the point cloud data through parallel computing and can improve the computational efficiency through parallel computing in response to a huge dataset. The present disclosure performs vectorization and normalization on the node, the point curvature matrix, and the point normal vector matrix of the point cloud data to obtain the trained point cloud data, thereby training the intelligent rock joint identification model. This can quickly obtain the intelligent rock joint identification model with a higher identification accuracy and improves the identification speed and accuracy of the rock joint. The present disclosure performs data segmentation on the rock joint set and extracts the single rock joint through parallel computing, thus improving the extraction speed of the single rock joint. With the above method, the present disclosure not only can keep a computed occurrence at a high accuracy but also greatly improves the identification efficiency.

BRIEF DESCRIPTION OF THE DRAWINGS

FIG. 1 is a flowchart showing a method according to an embodiment of the present disclosure;

Figure 2:
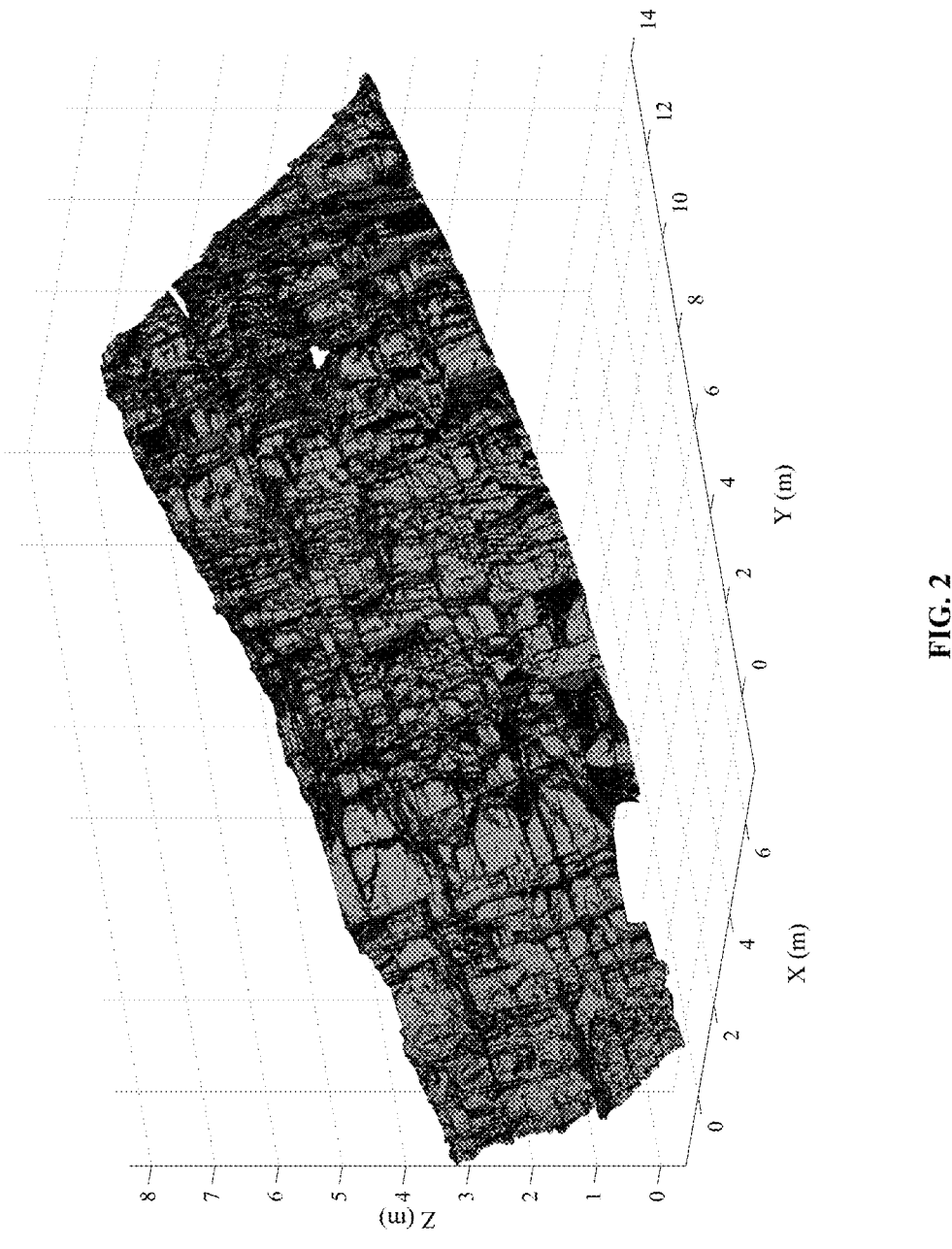
FIG. 2 is a schematic view of a rock joint set.

The implementations of the objectives, functional characteristics, and advantages of the present disclosure will be further described below with reference to the embodiments and the drawings.

DETAILED DESCRIPTION OF THE EMBODIMENTS

It should be understood that the specific embodiments described herein are only intended to explain the present disclosure and are not intended to limit the present disclosure.

Referring to FIG. 1, the present disclosure provides a method for quickly measuring a rock joint of a rock mass based on huge point cloud data, including:

In S1, an initial point cloud dataset for the rock joint of the rock mass is acquired. Preprocessing and node vectorization are performed on the initial point cloud dataset to obtain a vectorized point cloud coordinate data matrix. Computation is performed by introducing parallel computing to obtain a point curvature matrix and a point normal vector matrix corresponding to the vectorized point cloud coordinate data matrix.

In S2, global parameter vectorization, normalization, and data screening are sequentially performed on the vectorized point cloud coordinate data matrix, the point curvature matrix, and the point normal vector matrix to obtain a training point cloud dataset.

In S3, an intelligent rock joint identification model is constructed through a shallow neural network. The intelligent rock joint identification model is trained through the training point cloud dataset to obtain a well-trained intelligent rock joint identification model.

In S4, a to-be-measured point cloud dataset is acquired, and rock joint identification is performed on the to-be-measured point cloud dataset through the well-trained intelligent rock joint identification model to obtain a plurality of rock joint sets.

In S5, data segmentation is performed on a rock joint set with a number of single rock joints greater than a preset value, other than a rock joint set with a number of single rock joints less than the preset value. The single rock joints are extracted from the rock joint set through parallel computing. An occurrence of each of the single rock joints in the rock joint set is computed.

Further, the step S1 specifically includes:

In S11, the initial point cloud dataset for the rock joint of the rock mass is acquired. Filtration and denoising are performed on the initial point cloud dataset to obtain a preprocessed point cloud dataset.

Specifically, point cloud data for the rock joint of the rock mass is acquired as follows: An outcrop for the rock joint of the rock mass with intact exposure, sparse vegetation, and convenient transportation is found. Field data is acquired in favorable weather. In the erection of a tripod, a flat and hard ground is selected to ensure the stable operation of the instrument. An appropriate scanning distance is selected according to a range, a spatial condition, and the accuracy required for the outcrop.

Preprocessing, such as filtration and denoising, is performed on acquired data using a Matlab software algorithm.

In S12, an x-axis coordinate set, a y-axis coordinate set and a z-axis coordinate set of each node in the preprocessed point cloud dataset are merged into the vectorized point cloud coordinate data matrix M. the M is expressed as:

$$
M = (x \quad y \quad z) = \begin{pmatrix} x_1 & y_1 & z_1 \\ x_2 & y_2 & z_2 \\ \vdots & \vdots & \vdots \\ x_{i-1} & y_{i-1} & z_{i-1} \\ x_i & y_i & z_i \end{pmatrix}_{i \times 3}
$$

$$
x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}
$$

where, i is a total number of nodes, $x_i$ is an x-axis coordinate of an ith node, $y_i$ is a y-axis coordinate of the ith node, and $z_i$ is a z-axis coordinate of the ith node.

In S13, for a node $(x_u, y_u, z_u)$, four neighboring nodes and the node are taken as a point matrix. The node has a weight of 2, and the four neighboring nodes have a weight of 1. Fitting is performed on the point matrix through a least square method to obtain a plane $p_u$ of the node $(x_u, y_u, z_u)$. A normal vector of the plane $p_u$ is taken as a point normal vector of the node $(x_u, y_u, z_u)$. u is the serial number of the node, and the u has a maximum of i.

In S14, an eigenvalue and an eigenvector for a covariance matrix of the node $(x_u, y_u, z_u)$ are computed, and a point curvature of the node $(x_u, y_u, z_u)$ is computed through the eigenvalue and the eigenvector.

In S15, the computation is performed by parallel computing to obtain point curvatures and point normal vectors of all of the nodes, thereby obtaining the point curvature matrix and the point normal vector matrix.

Further, the step S2 specifically includes:

In S21, the vectorized point cloud coordinate data matrix, the point curvature matrix, and the point normal vector matrix are merged into a variable matrix A.

In S22, normalization is performed on the variable matrix A, and a numerical value is mapped to [0,1] to obtain a normalized data matrix P'.

In S23, a node with an eigenvalue greater than a preset value is screened from the normalized data matrix P', and the screened node is taken as the training point cloud dataset.

Further, the variable matrix A is expressed as:

$$A = (x \quad y \quad z \quad X \quad Y \quad Z \quad k) = \begin{pmatrix} x_1 & y_1 & z_1 & X_1 & Y_1 & Z_1 & k_1 \\ x_2 & x_2 & x_2 & x_2 & x_2 & x_2 & x_2 \\ \vdots & \vdots & \vdots & \vdots & \vdots & \vdots & \vdots \\ x_{i-1} & x_{i-1} & x_{i-1} & x_{i-1} & x_{i-1} & x_{i-1} & x_{i-1} \\ x_i & x_i & x_i & x_i & x_i & x_i & x_i \end{pmatrix}_{i \times 7}$$

$$x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}$$

$$X = \begin{pmatrix} X_1 \\ X_2 \\ \vdots \\ X_{i-1} \\ X_i \end{pmatrix}_{i \times 1} \quad Y = \begin{pmatrix} Y_1 \\ Y_2 \\ \vdots \\ Y_{i-1} \\ Y_i \end{pmatrix}_{i \times 1} \quad Z = \begin{pmatrix} Z_1 \\ Z_2 \\ \vdots \\ Z_{i-1} \\ Z_i \end{pmatrix}_{i \times 1} \quad k = \begin{pmatrix} k_1 \\ k_2 \\ \vdots \\ k_{i-1} \\ k_i \end{pmatrix}_{i \times 1}$$

where, i is a total number of nodes, $x_i$ is an x-axis coordinate of an ith node, $y_i$ is a y-axis coordinate of the ith node, $z_i$ is a z-axis coordinate of the ith node, $X_i$ is a component of a point normal vector of the ith node in an x-axis direction, $Y_i$ is a component of the point normal vector of the ith node in a y-axis direction, $Z_i$ is a component of the point normal vector of the ith node in a z-axis direction, and $k_i$ is a point curvature of the ith node.

Further, the normalized data matrix P' is expressed as:

$$P' = \frac{A - B}{C - B}$$

$$B = \begin{pmatrix} \min(x) & \min(y) & \min(z) & \min(X) & \min(Y) & \min(Z) & \min(k) \\ \min(x) & \min(y) & \min(z) & \min(X) & \min(Y) & \min(Z) & \min(k) \\ \vdots & \vdots & \vdots & \vdots & \vdots & \vdots & \vdots \\ \min(x) & \min(y) & \min(z) & \min(X) & \min(Y) & \min(Z) & \min(k) \\ \vdots & \vdots & \vdots & \vdots & \vdots & \vdots & \vdots \end{pmatrix}_{i \times 7}$$

$$C = \begin{pmatrix} \max(x) & \max(y) & \max(z) & \max(X) & \max(Y) & \max(Z) & \max(k) \\ \max(x) & \max(y) & \max(z) & \max(X) & \max(Y) & \max(Z) & \max(k) \\ \vdots & \vdots & \vdots & \vdots & \vdots & \vdots & \vdots \\ \max(x) & \max(y) & \max(z) & \max(X) & \max(Y) & \max(Z) & \max(k) \\ \vdots & \vdots & \vdots & \vdots & \vdots & \vdots & \vdots \end{pmatrix}_{i \times 7}$$

where, min( ) is to take a minimum element in the matrix, and max( ) is to take a maximum element in the matrix.

Further, in step S23, 70% of learning samples are taken as a training sample for the intelligent rock joint identification model, 15% of learning samples are taken as a test sample, and 15% of learning samples are taken as a verification sample.

Further, in step S3, a node on an input layer, a hidden layer, and an output layer of the intelligent rock joint identification model is determined. A corresponding training function and performance function are set. The intelligent rock joint identification model is trained through the training point cloud dataset. In numerous training models, a model with a desirable predicted result is selected as the well-trained intelligent rock joint identification model.

Further, upon identification of each rock joint set, whether the data segmentation is performed depends on the number of single rock joints in the rock joint set in the identification result. In response to a larger number of single rock joints in the set, the data segmentation is performed according to the process in step S5.

A range for an x-axis coordinate, a y-axis coordinate, and a z-axis coordinate of a block to be segmented is computed. Data points are searched and extracted according to the range. The data segmentation is performed.

The step S5 specifically includes:

In S51, a coordinate range of a segmented block is set. Through the coordinate range, the data segmentation is performed on the rock joint set with the number of single rock joints being greater than the preset value.

In S52, a data point in any rock joint set is selected. A radius range is set with the data point as a center. If a number of data points in the radius range is greater than a threshold, the data point is deemed as a core point. If a data point in the radius range of the core point is also a core point, the two core points are classified into the same cluster.

In S53, all data points in the rock joint set are sequentially traversed through parallel computing to obtain a plurality of clusters. The single rock joints are extracted through the clusters.

Specifically, after segmenting, the rock joint set with a large data size is allocated to different cores. Merging is performed upon completion of the computation. The rock joint sets with a small data size can be computed at the same time according to a computer core condition.

In S54, the occurrence of the single rock joint is computed through PCA.

Further, the coordinate range of the segmented block is expressed as:

$$X\min_{n \times m} = \min(x)$$

$$X\max_{n \times m} = \max(x)$$

$$Y\min_{n \times m} = \min(y) + (n - 1)[\max(y) - \min(y)] \div H$$

$$Y\max_{n \times m} = \min(y) + (n)[\max(y) - \min(y)] \div H$$

$$Z\min_{n \times m} = \min(z) + (m - 1)[\max(z) - \min(z)] \div J$$

$$Z\max_{n \times m} = \min(z) + (m)[\max(z) - \min(z)] \div J$$

$$x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}$$

-continued $$X = \begin{pmatrix} X_1 \\ X_2 \\ \vdots \\ X_{i-1} \\ X_i \end{pmatrix}_{i \times 1} Y = \begin{pmatrix} Y_1 \\ Y_2 \\ \vdots \\ Y_{i-1} \\ Y_i \end{pmatrix}_{i \times 1} Z = \begin{pmatrix} Z_1 \\ Z_2 \\ \vdots \\ Z_{i-1} \\ Z_i \end{pmatrix}_{i \times 1}$$

where, i is a total number of nodes, $x_i$ is an x-axis coordinate of an ith node, $y_i$ is a y-axis coordinate of the ith node, $z_i$ is a z-axis coordinate of the ith node, $X_i$ is a component of a point normal vector of the ith node in an x-axis direction, $Y_i$ is a component of the point normal vector of the ith node in a y-axis direction, and $Z_i$ is a component of the point normal vector of the ith node in a z-axis direction;

H represents a number of segmented blocks of the rock joint set in the y-axis direction, and J represents a number of segmented blocks of the rock joint set in the z-axis direction;

$X\ min_{n \times m}$ and $X\ max_{n \times m}$ respectively represent a minimum x-axis coordinate and a maximum x-axis coordinate on an nth column and an mth row after the rock joint set is segmented into H×J blocks;

$Y\ min_{n \times m}$ and $Y\ max_{n \times m}$ respectively represent a minimum y-axis coordinate and a maximum y-axis coordinate on the nth column and the mth row after the rock joint set is segmented into the H×J blocks; and $Z\ min_{n \times m}$ and $Z\ max_{n \times m}$ respectively represent a minimum z-axis coordinate and a maximum z-axis coordinate on the nth column and the mth row after the rock joint set is segmented into the H×J blocks.

Specifically, the rock joint set upon the data segmentation takes a bottommost row of datasets as the first row of datasets and a leftmost column of datasets as the first column of datasets. The rock joint set with a small number of single rock joints is not segmented.

Further, the step S54 specifically includes:

After the single rock joint in the dataset is extracted based on spatial clustering, plane fitting is performed on a classification point with the PCA to obtain a plane equation of the classification point:

$$Ax + By + Cz = D$$

where, A, B, C and D are constants.

At last, a dip ($\alpha$) and a dip direction ($\beta$) of the single rock joint are computed by a following equation. The dip ($\alpha$) and the dip direction ($\beta$) are taken as the occurrence of the single rock joint.

$$\alpha = \arccos\left(\left|\frac{C}{\sqrt{A^2 + B^2 + C^2}}\right|\right)$$

$$\text{if } A \geq 0, B \geq 0, \text{ and } C \geq 0, \beta = \arcsin\left(\left|\frac{A}{\sqrt{A^2 + B^2}}\right|\right)$$

$$\text{if } A < 0, B > 0, \text{ and } C \geq 0, \beta = 360 - \arcsin\left(\left|\frac{A}{\sqrt{A^2 + B^2}}\right|\right)$$

$$\text{if } A < 0, B < 0, \text{ and } C \geq 0, \beta = 180 + \arcsin\left(\left|\frac{A}{\sqrt{A^2 + B^2}}\right|\right)$$

$$\text{if } A > 0, B < 0, \text{ and } C \geq 0, \beta = 180 - \arcsin\left(\left|\frac{A}{\sqrt{A^2 + B^2}}\right|\right)$$

$$\text{if } A \geq 0, B \geq 0, \text{ and } C < 0, \beta = 180 + \arcsin\left(\left|\frac{A}{\sqrt{A^2 + B^2}}\right|\right)$$

-continued $$\text{if } A < 0, B > 0, \text{ and } C < 0, \beta = 180 - \arcsin\left(\left|\frac{A}{\sqrt{A^2 + B^2}}\right|\right)$$

$$\text{if } A < 0, B < 0, \text{ and } C < 0, \beta = \arcsin\left(\left|\frac{A}{\sqrt{A^2 + B^2}}\right|\right)$$

$$\text{if } A > 0, B < 0, \text{ and } C < 0, \beta = 360 - \arcsin\left(\left|\frac{A}{\sqrt{A^2 + B^2}}\right|\right)$$

Case Analysis

In order to demonstrate the efficiency and accuracy of the method in response to huge data, a dataset with 13,586,012 points are selected in the case. Two methods are used for rock joint identification and information extraction. In the first method, intelligent rock joint identification and information extraction are realized singly with an artificial neural network (ANN). In the second method, intelligent rock joint identification and information extraction are realized with parallel computing and vectorized computation and based on an ANN.

The computer used in the case has the following hardware parameters:

TABLE 1

| Parameters of the computer Computer model | | | | |
|---|---|---|---|---|
| | | Dell Precision 7540 | | |
| RAM | CPU type | CPU model | Dominant frequency of CPU | Maximum turbo frequency |
| 32 GB | Intel core i7 | Corei7-9750 | 2.6GHz | 4.5GHZ |
| Number of CPUs | Three-level buffer | Bus specification | CPU cores | CPU threads |
| 1 | 12 MB | DMI3 8GT/s | 6 | 12 |

Figure 3:
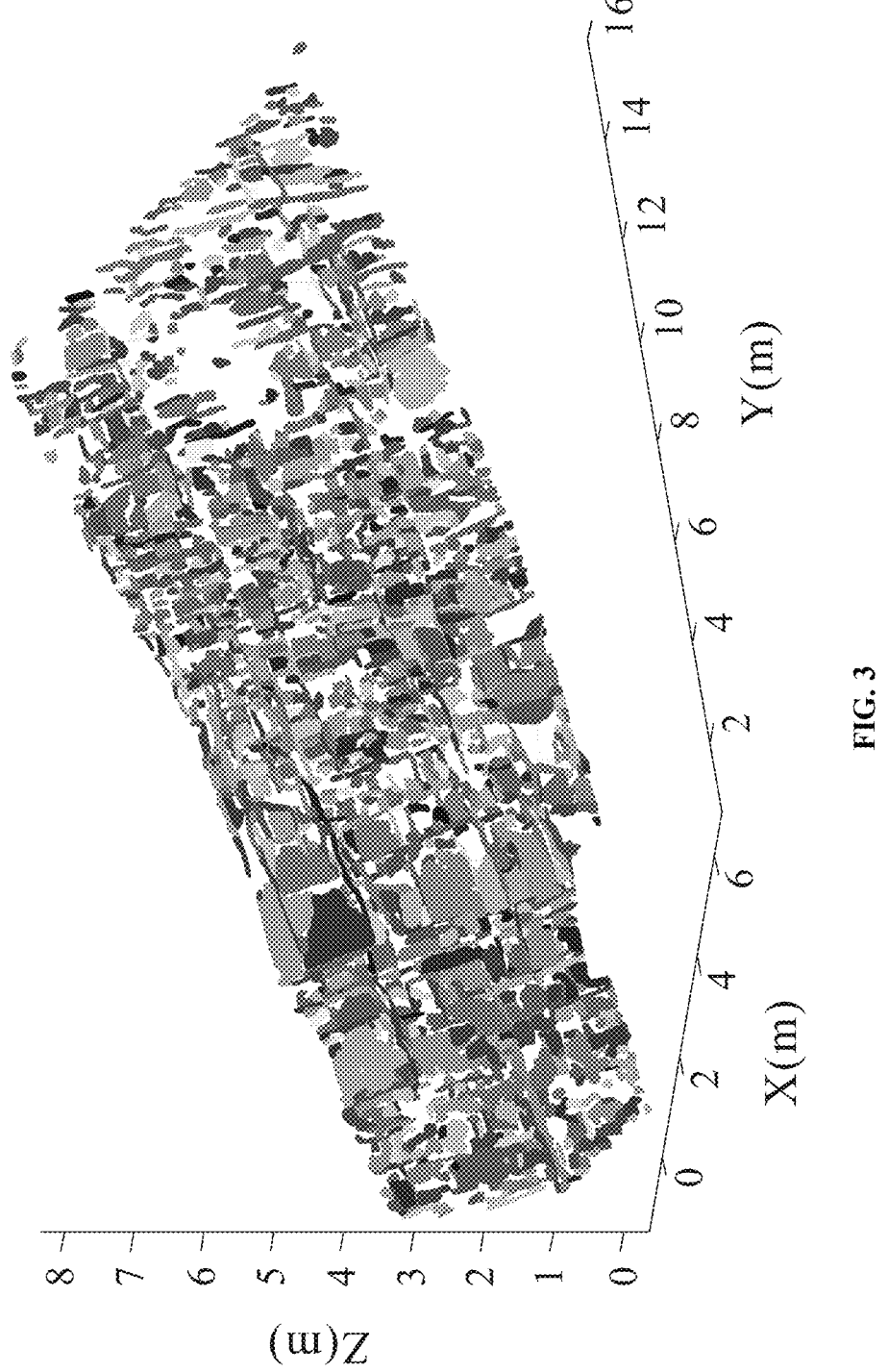
FIG. 3 illustrates an extraction result of a single rock joint.

FIG. 2 illustrates an intelligent identification result of a rock joint. In the dataset, there are three rock-joint sets and a plurality of non-rock-joint sets. Different rock joint sets are assigned with different colors. The non-rock-joint sets are black. FIG. 3 illustrates an extraction result of a single rock joint. Different colors represent different single rock joints. As can be seen obviously from the two photos, the identification result basically meets the actual condition and the required accuracy.

Figure 4:
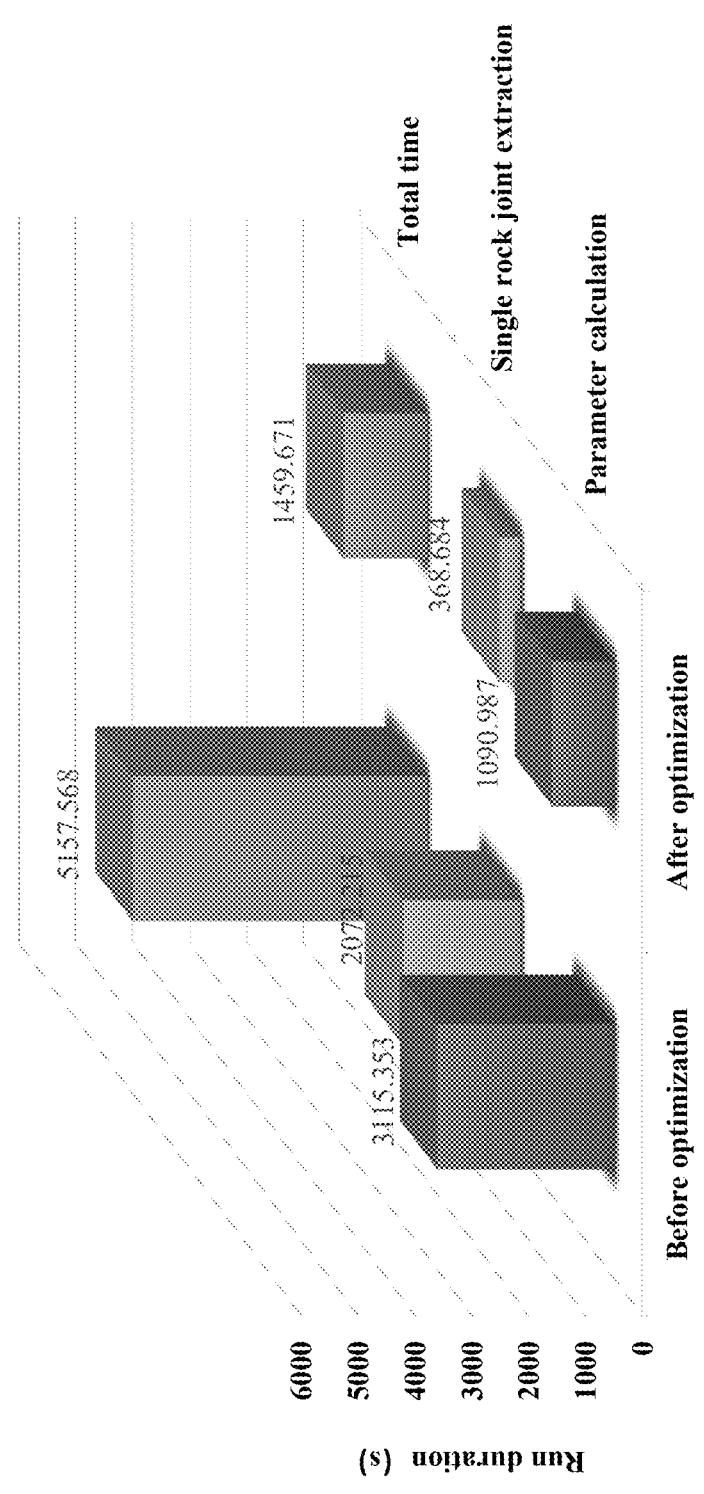
FIG. 4 illustrates a comparison in time before and after algorithm optimization.

FIG. 4 illustrates a comparison in algorithm running time before and after the method of the present disclosure is introduced to an intelligent rock joint identification algorithm. Since the time for computing the occurrence of the rock joint is short, manual point selection in the establishment of the neural network and identification of the rock joint is time-consuming, and time for running the algorithm in the real computer is short without parallelism, time for parameter computation (computation of a point normal vector and a point curvature) and time for extraction of the single rock joint in the algorithm are selected for comparison. As shown by Table 2, the optimized code running rate is greatly accelerated, the time for the parameter computation is reduced by 2.86 times, the time for the extraction of the single rock joint is reduced by 5 times or more, and the total time for the parameter computation and the extraction of the single rock joint is reduced by 3.55 times. Therefore, the algorithm running efficiency is greatly improved.

TABLE 2

| Comparison in time before and after optimization of the method | | | |
| --- | --- | --- | --- |
| | Before optimization | After optimization | Increased times |
| Parameter computation | 3115.353 s | 1090.987 s | 2.86 |
| Extraction of the single rock joint | 2072.215 s | 368.684 s | 5.62 |
| Total time | 5187.568 s | 1459.671 s | 3.55 |

In data parallel, data is to be segmented. In order to reflect different segmented forms intuitively, XnYnZn is used hereinafter. For example, X1Y3Z2 indicates that no data segmentation is performed in an X direction, the data is segmented two times in a Y direction to form three datasets, and the data is segmented again in a Z direction on the basis of segmentation in the Y direction, thereby obtaining six blocks. That is, the dataset is segmented into 1×3×2 blocks.

In order to demonstrate whether the segmented form or number impacts a result of the algorithm and guarantee the accuracy of the result before and after high-performance computation is introduced, results in eight different segmented forms are computed, including X1Y1Z1, X1Y2Z1, X1Y3Z1, X1Y4Z1, X1Y2Z2, X1Y5Z1, X1Y6Z1 and X1Y3Z2.

Figure 5:
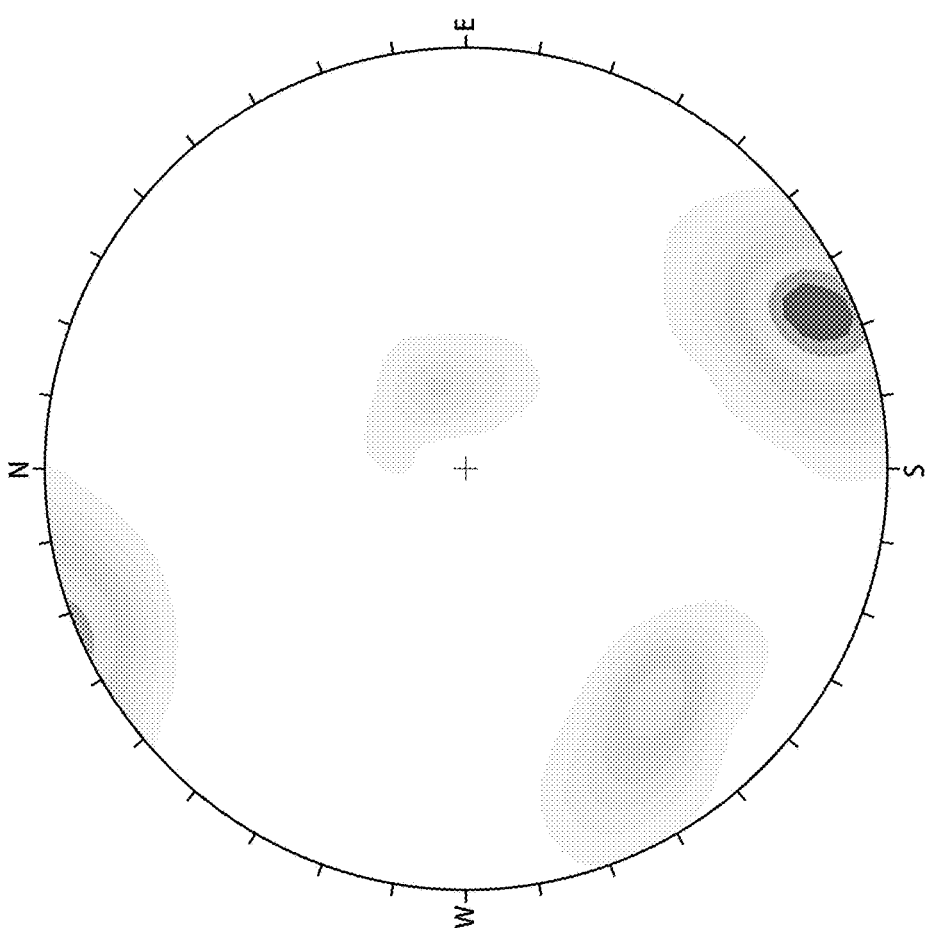
FIG. 5 is a schematic view of a segmented form X1Y1Z1.
Figure 6:
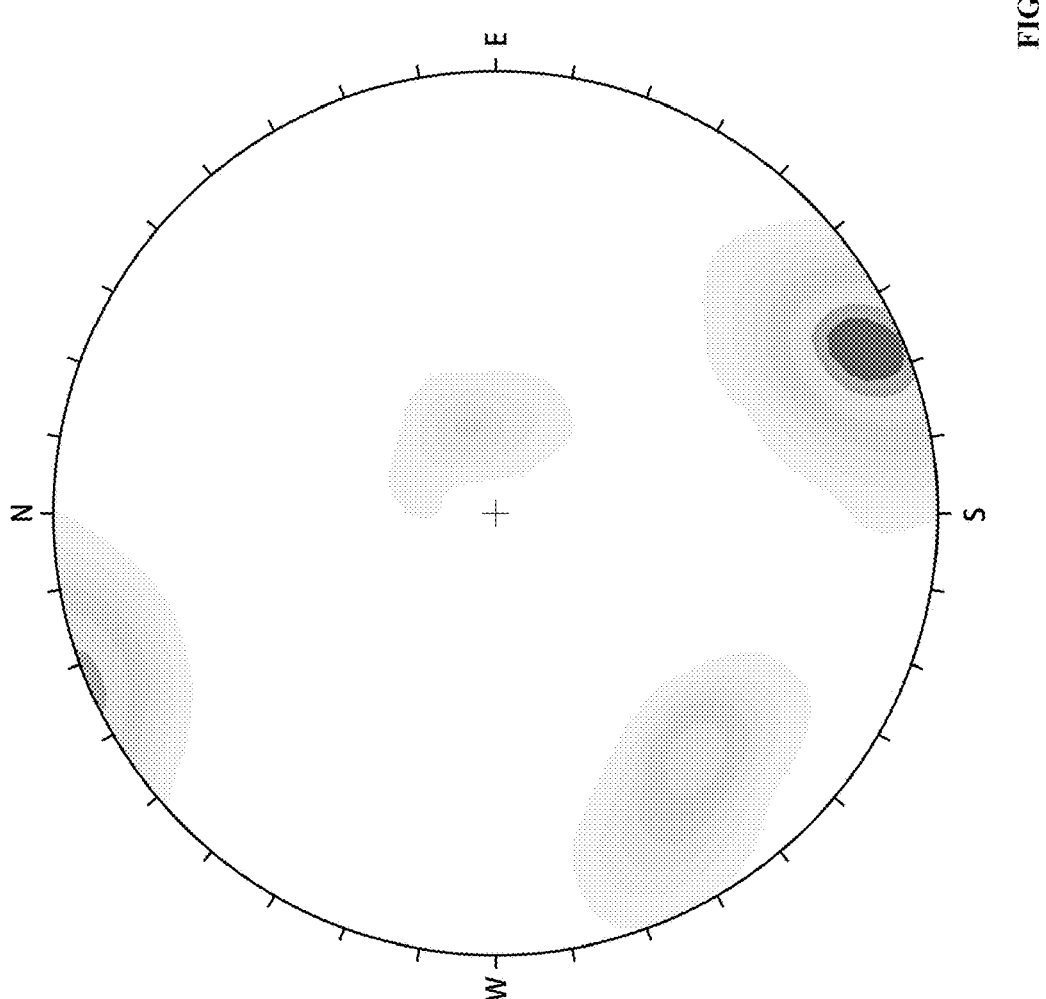
FIG. 6 is a schematic view of a segmented form X1Y2Z1.
Figure 7:
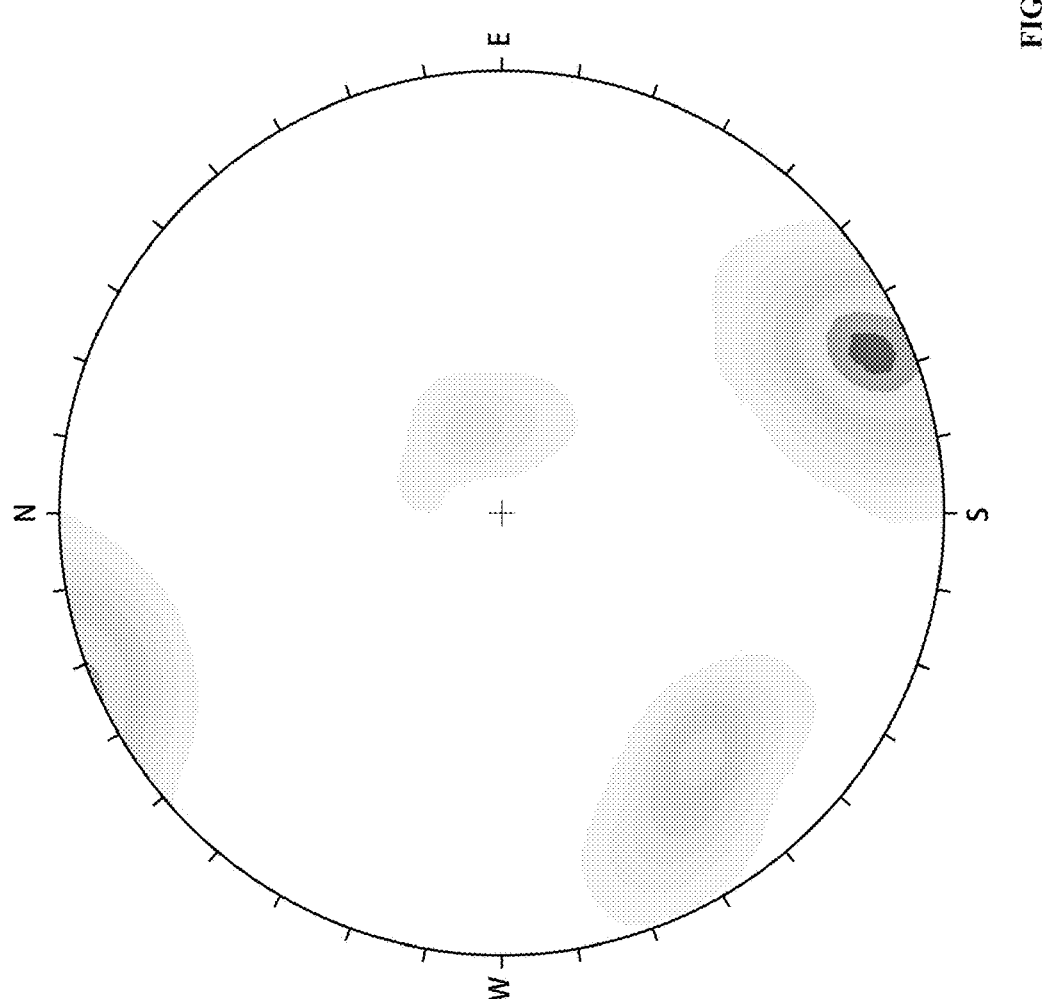
FIG. 7 is a schematic view of a segmented form X1Y2Z2.

FIG. 5 illustrates a segmented form X1Y1Z1, FIG. 6 illustrates a segmented form X1Y2Z1, and FIG. 7 illustrates a segmented form X1Y2Z2.

Figure 8:
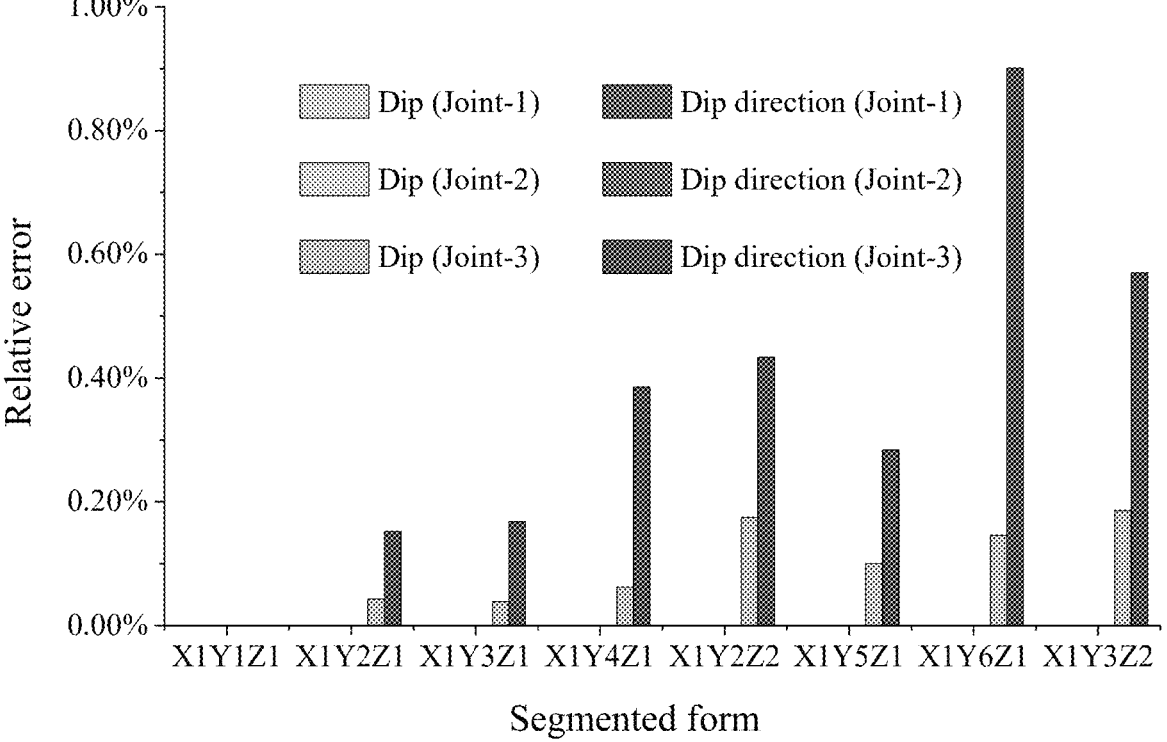
FIG. 8 is a schematic view of relative errors of different segmented forms.

In various segmented forms, the three rock joints have basically the same occurrence. As can be seen from FIG. 8, compared with an average of the computed results in the form without the segmentation, the average of the computed results in the remaining seven segmented forms has a relative error of less than 1%. This demonstrates that the segmented form or number has little impact on the result of the algorithm, and the computed accuracy meets the requirement.

The present disclosure provides a storage medium. The storage medium stores an instruction and data to realize the method for quickly measuring a rock joint of a rock mass based on huge point cloud data.

The present disclosure provides a device for quickly measuring a rock joint of a rock mass based on huge point cloud data, including a processor and a storage medium. The processor loads and executes an instruction and data in a storage medium to realize the method for quickly measuring a rock joint of a rock mass based on huge point cloud data.

It should be noted that the terms "including", "comprising" or any other variants thereof are intended to cover non-exclusive inclusions, such that a process, method, article, or system including a series of elements includes not only those elements but also other elements not explicitly listed, or elements inherent to such a process, method, article or system. Without further limitation, an element qualified by the phrase "including a . . . " does not exclude the presence of an additional identical element in the process, method, article, or system including the element.

The serial numbers of the embodiments of the present disclosure are merely for description and do not represent a preference of the embodiments. In the unit claims where several apparatuses are listed, several of the apparatuses may be embodied by the same hardware item. The use of terms such as first, second, and third does not indicate any order and can be interpreted as an identification.

The above is merely a favorable embodiment of the present disclosure and does not constitute a limitation on the patent scope of the present disclosure. Any equivalent structure or equivalent process change made by using the specification and the drawings of the present disclosure, or the direct or indirect application thereof in other related technical fields, should still fall in the protection scope of the patent of the present disclosure.

What is claimed is:

1. A method for measuring a rock joint of a rock mass based on huge point cloud data, comprising:
   acquiring an initial point cloud dataset for the rock joint of the rock mass, performing preprocessing and node vectorization on the initial point cloud dataset to obtain a vectorized point cloud coordinate data matrix, and performing computation by introducing parallel computing to obtain a point curvature matrix and a point normal vector matrix corresponding to the vectorized point cloud coordinate data matrix;
   sequentially performing global parameter vectorization, normalization, and data screening on the vectorized point cloud coordinate data matrix, the point curvature matrix, and the point normal vector matrix to obtain a training point cloud dataset;
   constructing an intelligent rock joint identification model through a shallow neural network, and training the intelligent rock joint identification model through the training point cloud dataset to obtain a well-trained intelligent rock joint identification model;
   acquiring a to-be-measured point cloud dataset, and performing rock joint identification on the to-be-measured point cloud dataset through the well-trained intelligent rock joint identification model to obtain a plurality of rock joint sets;
   and, performing data segmentation on a rock joint set with a number of single rock joints greater than a preset value, other than a rock joint set with a number of single rock joints less than the preset value, extracting the single rock joints from the rock joint set through the parallel computing, and computing to obtain an occurrence of each of the single rock joints in the rock joint set.

2. The method according to claim 1, wherein acquiring an initial point cloud dataset comprises: acquiring the initial point cloud dataset for the rock joint of the rock mass and performing filtration and denoising on the initial point cloud dataset to obtain a preprocessed point cloud dataset;
   merging an x-axis coordinate set, a y-axis coordinate set, and a z-axis coordinate set of each node in the preprocessed point cloud dataset into the vectorized point cloud coordinate data matrix M, the M being expressed as:

$$M = (x \quad y \quad z) = \begin{pmatrix} x_1 & y_1 & z_1 \\ x_2 & y_2 & z_2 \\ \vdots & \vdots & \vdots \\ x_{i-1} & y_{i-1} & z_{i-1} \\ x_i & y_i & z_i \end{pmatrix}_{i \times 3}$$

$$x = \begin{pmatrix} x_1 \\ x_2 \\ \vdots \\ x_{i-1} \\ x_i \end{pmatrix}_{i \times 1} \quad y = \begin{pmatrix} y_1 \\ y_2 \\ \vdots \\ y_{i-1} \\ y_i \end{pmatrix}_{i \times 1} \quad z = \begin{pmatrix} z_1 \\ z_2 \\ \vdots \\ z_{i-1} \\ z_i \end{pmatrix}_{i \times 1}$$

wherein, i is a total number of nodes, xi is an x-axis coordinate of an ith node, yi is a y-axis coordinate of the ith node, and zi is a z-axis coordinate of the ith node;

taking, for a node $(x_u, y_u, z_u)$, four neighboring nodes, and the node as a point matrix, wherein the node has a weight of 2, and the four neighboring nodes have a weight of 1;

performing fitting on the point matrix through a least square method to obtain a plane $p_u$ of the node $(x_u, y_u, z_u)$; and taking a normal vector of the plane $p_u$ as a point normal vector of the node $(x_u, y_u, z_u)$, wherein u is a serial number of the node, and the u has a maximum of i;

computing an eigenvalue and an eigenvector for a covariance matrix of the node $(x_u, y_u, z_u)$, and computing a point curvature of the node $(x_u, y_u, z_u)$ through the eigenvalue and the eigenvector;

and performing the computation by parallel computing to obtain point curvatures and point normal vectors of all of the nodes, thereby obtaining the point curvature matrix and the point normal vector matrix.

3. The method according to claim 1, wherein sequentially performing global parameter vectorization comprises:

merging the vectorized point cloud coordinate data matrix, the point curvature matrix, and the point normal vector matrix into a variable matrix A;

performing normalization on the variable matrix A, and mapping a numerical value to [0,1] to obtain a normalized data matrix P';

and screening a node with an eigenvalue greater than a preset value from the normalized data matrix P', and taking the screened node as the training point cloud dataset.

4. The method according to claim 3, wherein the variable matrix A is expressed as:

$$A = (x \quad y \quad z \quad X \quad Y \quad Z \quad k) = \begin{pmatrix} x_1 & y_1 & z_1 & X_1 & Y_1 & Z_1 & k_1 \\ x_2 & x_2 & x_2 & x_2 & x_2 & x_2 & x_2 \\ \vdots & \vdots & \vdots & \vdots & \vdots & \vdots & \vdots \\ x_{i-1} & x_{i-1} & x_{i-1} & x_{i-1} & x_{i-1} & x_{i-1} & x_{i-1} \\ x_i & x_i & x_i & x_i & x_i & x_i & x_i \end{pmatrix}_{i \times 7}$$

$$x = \begin{pmatrix} x_1 \\ x_2 \\ \vdots \\ x_{i-1} \\ x_i \end{pmatrix}_{i \times 1} y = \begin{pmatrix} y_1 \\ y_2 \\ \vdots \\ y_{i-1} \\ y_i \end{pmatrix}_{i \times 1} z = \begin{pmatrix} z_1 \\ z_2 \\ \vdots \\ z_{i-1} \\ z_i \end{pmatrix}_{i \times 1}$$

$$X = \begin{pmatrix} X_1 \\ X_2 \\ \vdots \\ X_{i-1} \\ X_i \end{pmatrix}_{i \times 1} Y = \begin{pmatrix} Y_1 \\ Y_2 \\ \vdots \\ Y_{i-1} \\ Y_i \end{pmatrix}_{i \times 1} Z = \begin{pmatrix} Z_1 \\ Z_2 \\ \vdots \\ Z_{i-1} \\ Z_i \end{pmatrix}_{i \times 1} k = \begin{pmatrix} k_1 \\ k_2 \\ \vdots \\ k_{i-1} \\ k_i \end{pmatrix}_{i \times 1}$$

wherein, i is a total number of nodes, $x_i$ is an x-axis coordinate of an ith node, $y_i$ is a y-axis coordinate of the ith node, Z is a z-axis coordinate of the ith node, $X_i$ is a component of a point normal vector of the ith node in an x-axis direction, $Y_i$ is a component of the point normal vector of the ith node in a y-axis direction, $Z_i$ is a component of the point normal vector of the ith node in a z-axis direction, and $k_i$ is a point curvature of the ith node.

5. The method according to claim 4, wherein the normalized data matrix P' is expressed as:

$$P' = \frac{A - B}{C - B}$$

$$B = \begin{pmatrix} \min(x) & \min(y) & \min(z) & \min(X) & \min(Y) & \min(Z) & \min(k) \\ \min(x) & \min(y) & \min(z) & \min(X) & \min(Y) & \min(Z) & \min(k) \\ \vdots & \vdots & \vdots & \vdots & \vdots & \vdots & \vdots \\ \min(x) & \min(y) & \min(z) & \min(X) & \min(Y) & \min(Z) & \min(k) \\ \vdots & \vdots & \vdots & \vdots & \vdots & \vdots & \vdots \end{pmatrix}_{i \times 7}$$

$$C = \begin{pmatrix} \max(x) & \max(y) & \max(z) & \max(X) & \max(Y) & \max(Z) & \max(k) \\ \max(x) & \max(y) & \max(z) & \max(X) & \max(Y) & \max(Z) & \max(k) \\ \vdots & \vdots & \vdots & \vdots & \vdots & \vdots & \vdots \\ \max(x) & \max(y) & \max(z) & \max(X) & \max(Y) & \max(Z) & \max(k) \\ \vdots & \vdots & \vdots & \vdots & \vdots & \vdots & \vdots \end{pmatrix}_{i \times 7}$$

wherein, min( ) is to take a minimum element in the matrix, and max( ) is to take a maximum element in the matrix.

6. The method according to claim 1, wherein performing data segmentation comprises:

setting a coordinate range of a segmented block, and performing, through the coordinate range, the data segmentation on the rock joint set with the number of single rock joints being greater than the preset value;

selecting a data point in any rock joint set and setting a radius range with the data point as a center, wherein if a number of data points in the radius range is greater than a threshold, the data point is deemed as a core point; and if a data point in a radius range of the core point is also a core point, the two core points are classified into a same cluster;

sequentially traversing all data points in the rock joint set through the parallel computing to obtain a plurality of clusters, extracting the single rock joints through the clusters;

and computing the occurrence of the single rock joint through principal component analysis (PCA).

7. The method according to claim 6, wherein the coordinate range of the segmented block is expressed as:

$$X\min_{n \times m} = \min(x)$$

$$X\max_{n \times m} = \max(x)$$

$$Y\min_{n \times m} = \min(y) + (n-1)[\max(y) - \min(y)] \div H$$

$$Y\max_{n \times m} = \min(y) + (n)[\max(y) - \min(y)] \div H$$

$$Z\min_{n \times m} = \min(z) + (m-1)[\max(z) - \min(z)] \div J$$

$$Z\max_{n \times m} = \min(z) + (m)[\max(z) - \min(z)] \div J$$

$$x = \begin{pmatrix} x_1 \\ x_2 \\ \vdots \\ x_{i-1} \\ x_i \end{pmatrix}_{i \times 1} y = \begin{pmatrix} y_1 \\ y_2 \\ \vdots \\ y_{i-1} \\ y_i \end{pmatrix}_{i \times 1} z = \begin{pmatrix} z_1 \\ z_2 \\ \vdots \\ z_{i-1} \\ z_i \end{pmatrix}_{i \times 1}$$

$$X = \begin{pmatrix} X_1 \\ X_2 \\ \vdots \\ X_{i-1} \\ X_i \end{pmatrix}_{i \times 1} Y = \begin{pmatrix} Y_1 \\ Y_2 \\ \vdots \\ Y_{i-1} \\ Y_i \end{pmatrix}_{i \times 1} Z = \begin{pmatrix} Z_1 \\ Z_2 \\ \vdots \\ Z_{i-1} \\ Z_i \end{pmatrix}_{i \times 1}$$

wherein, i is a total number of nodes, $x_i$ is an x-axis coordinate of an ith node, $y_i$ is a y-axis coordinate of the ith node, $z_i$ is a z-axis coordinate of the ith node, $X_i$ is a component of a point normal vector of the ith node in an x-axis direction, $Y_i$ is a component of the point normal vector of the ith node in a y-axis direction, and $Z_i$ is a component of the point normal vector of the ith node in a z-axis direction;

H represents a number of segmented blocks of the rock joint set in the y-axis direction, and J represents a number of segmented blocks of the rock joint set in the z-axis direction;

X $\min_{n \times m}$ and X $\max_{n \times m}$ respectively represent a minimum x-axis coordinate and a maximum x-axis coordinate on an nth column and an mth row after the rock joint set is segmented into H×J blocks;

Y $\min_{n \times m}$ and Y $\max_{n \times m}$ respectively represent a minimum y-axis coordinate and a maximum y-axis coordinate on the nth column and the mth row after the rock joint set is segmented into the H×J blocks; and Z $\min_{n \times m}$ and Z $\max_{n \times m}$ respectively represent a minimum z-axis coordinate and a maximum z-axis coordinate on the nth column and the mth row after the rock joint set is segmented into the H×J blocks.

8. A device for measuring a rock joint of a rock mass based on huge point cloud data, comprising a processor and a storage medium, wherein the processor loads and executes an instruction and data in a storage medium to realize the method for quickly measuring the rock joint of the rock mass based on the huge point cloud data according to claim 1.

\* \* \* \* \*